Figure 2:
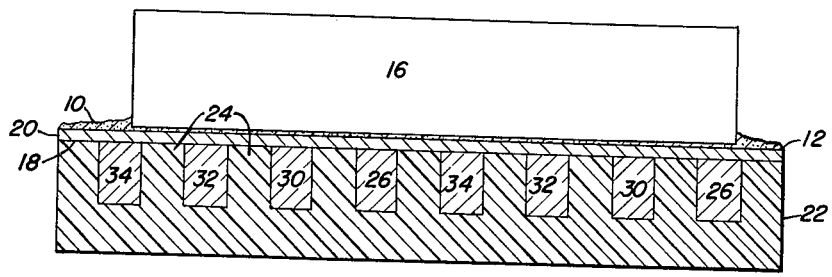

July 27, 1965

D. L. KLASS ETAL 3,197,682

SAFE ELECTRO-RESPONSIVE-FLUID CHUCK

Filed April 13, 1961

2 Sheets-Sheet 1

INVENTORS
DONALD L. KLASS
BY THOMAS W. MARTINEK
LYNN E. ELLISON

Edward H. Fancy
ATTORNEY

INVENTORS
DONALD L. KLASS
THOMAS W. MARTINEK
BY LYNN E. ELLISON

ATTORNEY

United States Patent Office 3,197,682
Patented July 27, 1965

3,197,682
SAFE ELECTRO-RESPONSIVE-FLUID CHUCK
Donald L. Klass, Barrington, and Thomas W. Martinek and Lynn E. Ellison, Crystal Lake, Ill., assignors to The Pure Oil Company, Chicago, Ill., a corporation of Ohio
Filed Apr. 13, 1961, Ser. No. 102,706
4 Claims. (Cl. 317—262)

This invention relates to an apparatus and method by which shock hazard can be eliminated in the operation of electrofluid chucking devices.

It is known that certain fluids, herein designated "electrofluids," respond to the presence of alternating electric fields by manifesting an apparent change in bulk viscosity. It is further known that certain electrofluids exhibit this apparent change in bulk viscosity under the influence of an alternating electric field, where the field is applied directly across the electrofluid film, and the electrofluid is in contact with both electrodes, as is taught, for example, by the patents to Winslow, 2,661,596 and 2,661,825. It is further known that if a film of electrofluid is disposed on a thin dielectric surface, an alternating electric field is applied to the film from beneath the surface, and an article is placed on or in the electrofluid film, the electrofluid, energized by the electric field, will secure the object firmly in place. Apparatus of this class are designated electrofluid chucking devices.

Electrofluid chucking devices have been found to be subject to a shock hazard when the operator touches a conductive workpiece being held by the chuck. A high-potential arc jumps from the operator's finger to the workpiece just as the finger is about to make physical contact, and a similar arc is produced when contact is broken. While the current flow is too minute to injure the operator, the shock nevertheless may cause discomfort to the operator, and may further cause him to move inadvertently, possibly with unfortunate results.

It is a primary object of this invention to provide a method of operating electrofluid chucking devices in which the hazard of shock to the operator is eliminated, or greatly decreased.

Another object of this invention is to provide an electrofluid chucking apparatus whereby the operator is not exposed to shock hazard.

In accordance with this invention, shock to the operator has been eliminated by including spaced, grounded electrodes in the non-conductive base of the chucking device. The grounded electrodes may have surfaces in the same plane as the surfaces of the power electrodes, and be in contact with the dielectric surface against which the electrofluid is placed, or the grounded electrodes may be completely embedded within the base of the chuck.

Figure 1:
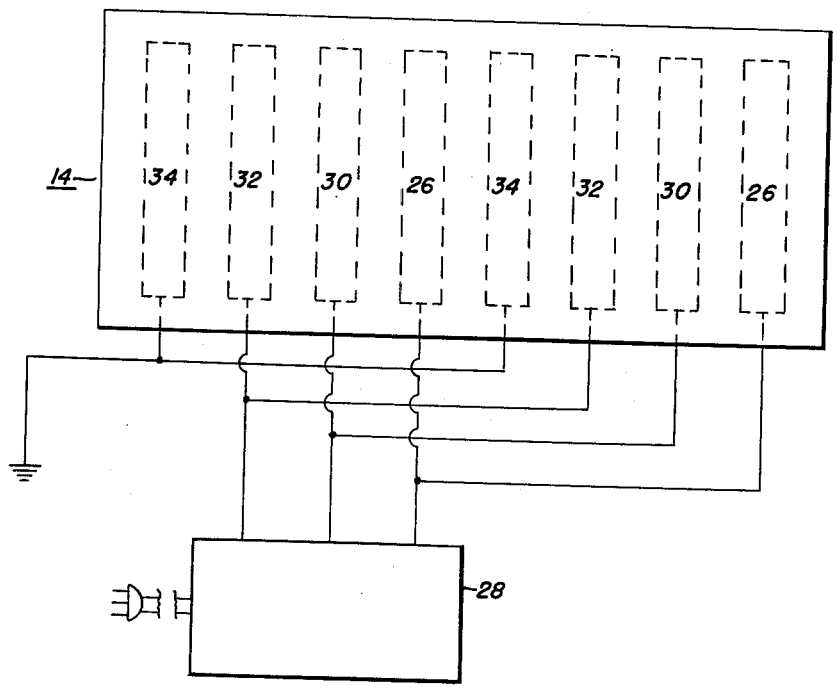
Figure 4:
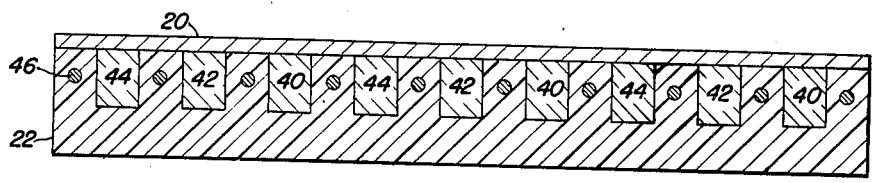
Figure 3:
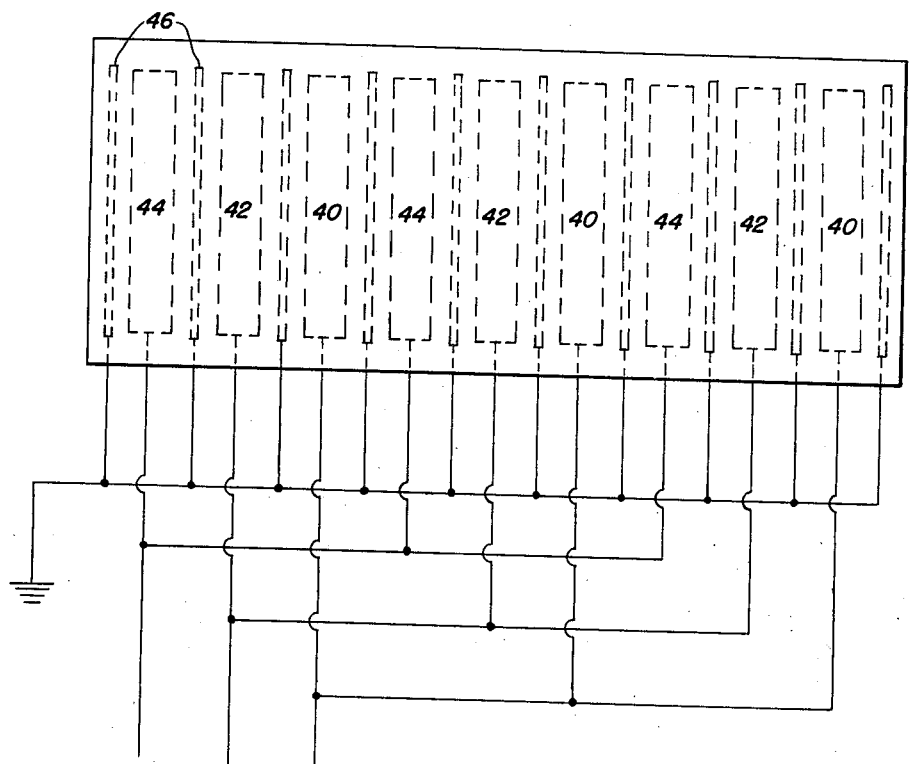

The invention is best described with reference to the drawings of which,

FIGURE 1 is a plan view of an electrofluid chucking device fabricated in accordance with this invention, FIGURE 2 is a frontal, elevational view, in section of the chucking device depicted in FIGURE 1, FIGURE 3 is a plan view of an alternate embodiment of the apparatus of this invention, and FIGURE 4 is an elevational view, in section, of the embodiment depicted in FIGURE 3.

Referring to FIGURES 1 and 2, a film of electrofluid 10 is disposed on the flat supper surface 12 of electrofluid chuck 14. Resting on, and partially immersed in, the electrofluid film 10 is flat-surfaced object 16, which is to be secured in place by the device. Electrofluid chuck 14 consists of a plurality of electrodes of rectangular cross-section arranged in spaced relationship such that the upper surfaces of the rectangular electrodes lie in a common plane 18, which plane is the lower surface of a thin layer of dielectric material, 20. The electrodes are maintained in spaced relationship by base 22, which is fabricated of a high-resistivity material. The base provides a plurality of "comb teeth" or laminations 24 which extend between the spaced electrodes. The electrodes may be fabricated of any suitable conductor, such as steel, and are arranged in four sets. The first electrode set 26 comprises two electrodes which are electrically connected together and to one phase of three-phase power source 28. Electrode set 30 is connected to a second phase of the power source, and electrode set 32 is connected to a third phase of the power source. The fourth electrode set, which comprises the electrodes 34, is connected by means of an electrical conductor to ground.

Referring to FIGURES 3 and 4, an alternate embodiment of the apparatus of this invention is depicted. The chuck here embodied has a base 22 and a layer of dielectric material 20, as does the chucking device of FIGURE 1. The power electrodes, 40, 42, and 44 are arranged in three sets designated by the aforesaid numerals, and are connected to be energized by a three-phase power source in a manner analogous to that described with reference to FIGURE 1. Adjacent to each lateral surface of each power electrode is disposed a relatively thin, circular electrode which is grounded by means of a ground wire.

In operation, a block of steel having a flat surface may be placed on a film of electrofluid disposed on the dielectric layer of the chucking devices depicted in FIGURES 1 to 4. When the power electrodes have been connected to a power source and energized, the object will be secured in place by the electrofluid film. Upon touching the object, the operator will experience a shock, the magnitude of the shock being proportional to the applied voltage used to energize the chucking device. When the ground electrodes are connected to a suitable ground, such as a machine bed or water pipe, the operation and holding power of the chucking device will be found to be unaffected. However, no shock will be felt by the operator upon touching the object secured by the chuck.

The electrodes employed in the apparatus of this invention may be fabricated of any suitable conductor, such as steel. The laminations are preferably fabricated of a high-resistivity, thermoplastic or thermosetting resin which will adhere to the lateral surfaces of the electrodes to form a unitary chuck of suitable rigidity. The high-resistivity plastic material will preferably extend beyond the bottom of the electrodes to form a suitable insulating base for the device. Alternatively, ceramic laminations may be used, the ceramic members being secured to the steel electrodes by a suitable cement.

The electrofluid chucking devices of this invention may be made to operate upon three-phase, or other multiple-phase electric potential, although three-phase potential is preferred because it is convenient and provides improved holding power. It will be obvious to those skilled in the art that devices intended for use on multiple-phase potentials can be formed by adding or eliminating electrode sets as is necessary. In its simplest form, the chuck will comprise merely four power electrodes connected to a three-phase potential source, with the fourth electrode grounded. It is preferable that three sets of electrodes be employed to operate on a three-phase potential, and it is desirable that at least two electrodes be connected to each power phase.

The applied potential may range from 100 to 10,000 volts. The selection of potential is not critical, but should be sufficient to provide adequate holding strength without exceeding the break-down potential of the dielectric layer. The spacing of the electrodes is not critical, satisfactory results being obtained with electrodes having a width of about one-quarter inch and being separated by a distance of about one-quarter inch in the embodiments shown in FIGURES 1 and 2. For the embodiment shown in FIGURES 3 and 4, the spacing between the power electrodes, which electrodes may be one-quarter of an inch in width, may be about three-eighths of an inch, and ground electrodes having a diameter of about one-sixteenth of an inch may be disposed adjacent to each lateral surface of the power electrodes. The cross-sectional shape of the electrodes is not critical, but it is preferred that the surface of the power electrode in contact with the dielectric layer be flat. It is preferred that the electrodes be of such size and spacing that the object be secured over at least three power electrodes and at least one grounded electrode. The thickness of the dielectric layer may vary, but excellent results have been found to be obtained employing layers having a thickness in the range of 0.10 to 0.30 inch.

It has been found that at any applied potential, the grounding of the grounded electrodes has no measurable effect on the holding power of the chucking device. Neither has any measurable current been found to flow through the grounding wire. It appears probable, however, that small induced currents do flow to the grounded electrodes, and therefore the power input to the chuck, which is ordinarily infinitesimally small, may be increased by some slight increment.

The holding power of the device is dependent upon the number of electrodes employed, the number of phases of the potential employed, the magnitude of the applied potential, and the nature of the electrofluid film. Conventional electrofluids adapted for use in alternating potential fields may be employed to secure the chuck and object to be held together. Where it is desired to secure non-metallic objects, the electrofluid should be pigmented with from about 2% to 20% of a conductive metal. Electrofluids suitable for use with the chuck of this invention are known in the art. Specific formulations may be found in the patents to Willis M. Winslow, aforementioned, and in application Serial No. 71,625, filed November 25, 1960, by Donald L. Klass and Vincent Brozowski, now Patent No. 3,013,290, and in application Serial No. 73,326, filed December 2, 1960, by Thomas W. Martinek, Donald L. Klass, and Vincent Brozowski.

Suitable high-resistivity materials which may be used to support the electrodes in proper spaced relationship include epoxy resins, urea-formaldehyde resins, and polyethylene resins. Additionally, high-resistivity ceramic materials may be used. Materials which may be used as the dielectric layer are those having high resistivity and high dielectric constant, and include the metal titanates, such as those of barium, calcium, and strontium, mixed titanates, and other non-conductive ceramics.

As a specific example of the use of the apparatus of this invention, an electrofluid chucking device corresponding to that depicted in FIGURES 3 and 4 is fabricated. The upper surface of the chuck is then coated with an electrofluid formulated as follows:

| | Grams |
|---|---|
| Refined white oil | 36 |
| Silica | 51 |
| Glycerol monooleate | 4 |
| Ethylene glycol | 3 |
| 1-Hydroxyethyl-2-heptadecyl-imidazoline | 10.1 |
| N-aminoethyl ethanolamine | 1 |
| Barium titanate | 17 |

The mixture is spread freely on the surface of the chuck to a thickness of about one-thiry second of an inch. A non-magnetic, stainless-steel, rectangular test object extending substantially coextensively with the fluid film is placed in contact with the fluid film. Before the chuck is energized, the test object is found to move freely on the fluid film. A 2,500 volt, three-phase potential is then applied to the chuck. The test object is found to be held to the chuck surface. The holding force preventing lateral movement of the test object is measured to be about 40 ounces per square inch of contact area. The operator, upon touching the object, experiences a light shock. The ground electrodes are then connected through a low-resistant connector to a water pipe. The holding power of the chuck is again measured and found to be 40 ounces per square inch of contact area. The operator, upon touching the object secured by the chuck, feels no perceptible shock.

The embodiments of the invention in which an exclusive property or privilege is claimed are defined as follows:

1. A chuck comprising a plurality of spaced electrodes supported in co-planar and electrically insulated relationship; a thin layer of dielectric material supported adjacent to said plurality of electrodes, the exposed adjacent surfaces of said electrodes being in physical contact with the exposed surface of said dielectric layer; a film of electroviscous liquid covering and supported by the other exposed surface of said dielectric layer not in contact with said plurality of electrodes; means to connect said plurality of electrodes to an alternating potential source; other electrodes disposed adjacent to, but insulated from, the electrodes comprising said plurality; and means for grounding said other electrodes.

2. The chuck in accordance with claim 1 wherein said other electrodes are disposed in spaces between the electrodes comprising said plurality and are in physical contact with said dielectric material.

3. The chuck in accordance with claim 2 wherein the electrodes comprising said plurality are embedded in and supported by an electrically non-conducting base, at least one surface of each of said dielectrodes being flush with the surface of said base whereby said dielectric material is supported by the exposed surface of said electrodes and the surface of said base adjacent said electrodes.

4. The chuck in accordance with claim 1 including a three-phase potential source, and one grounded electrode is disposed between sets of three adjacent potential-connected electrodes.

References Cited by the Examiner

UNITED STATES PATENTS 2,025,123   12/35   Rahbek _____ 317—262 X
2,897,424   7/59   Waring _____ 317—262

SAMUEL BERNSTEIN, *Primary Examiner.*